United States Patent
Kato et al.

(10) Patent No.: US 9,461,681 B1
(45) Date of Patent: Oct. 4, 2016

(54) RECEIVER

(71) Applicant: HITACHI KOKUSAI ELECTRIC INC., Tokyo (JP)

(72) Inventors: Hiroki Kato, Tokyo (JP); Tatsuhiro Nakada, Tokyo (JP)

(73) Assignee: HITACHI KOKUSAI ELECTRIC INC. (JP)

( * ) Notice: Subject to any disclaimer, the term of this patent is extended or adjusted under 35 U.S.C. 154(b) by 0 days.

(21) Appl. No.: 15/169,913

(22) Filed: Jun. 1, 2016

Related U.S. Application Data

(63) Continuation of application No. PCT/JP2014/081730, filed on Dec. 1, 2014.

(30) Foreign Application Priority Data

Dec. 10, 2013 (JP) .................................. 2013 254967

(51) Int. Cl.
| | |
|---|---|
| *H04B 1/16* | (2006.01) |
| *H04B 1/10* | (2006.01) |
| H04B 7/08 | (2006.01) |
| H04W 52/02 | (2009.01) |

(52) U.S. Cl.
CPC ............. *H04B 1/1027* (2013.01); *H04B 1/16* (2013.01); *H04B 7/0857* (2013.01); *H04B 7/0874* (2013.01); *H04W 52/0238* (2013.01)

(58) Field of Classification Search
CPC ............. H04B 7/0857; H04B 7/0874; H04W 52/0238
See application file for complete search history.

(56) References Cited

U.S. PATENT DOCUMENTS

2010/0279642 A1    11/2010 Nishikawa

FOREIGN PATENT DOCUMENTS

| JP | H05-218890 A | 8/1993 |
|---|---|---|
| JP | H09-130770 A | 5/1997 |
| JP | 2004-201066 A | 7/2004 |
| JP | 2006-319608 A | 11/2006 |
| JP | 2008-187589 A | 8/2008 |
| JP | 2010-045706 A | 2/2010 |
| JP | 2010-130630 A | 6/2010 |
| JP | 2011-023870 A | 2/2011 |
| WO | 2009/072306 A1 | 11/2009 |

OTHER PUBLICATIONS

International Search Report dated Jan. 13, 2015.

*Primary Examiner* — Ross Varndell
(74) *Attorney, Agent, or Firm* — Bacon & Thomas, PLLC

(57) ABSTRACT

A receiver includes a first and a second amplification unit for amplifying a first and second received signals received by antenna units; a level variation detection unit for performing gain control of the first amplification unit; a maximum received signal level extraction unit for performing gain control of the second amplification unit; and a first and a second frequency conversion unit. The receiver further includes an interference frequency detection unit for detecting a frequency of interference in the second received signal; an interference frequency cut-off unit for cutting off the frequency of the interference; demodulation units for demodulating the respective received signals; noise amplitude calculation unit for calculating noise amplitudes from the respective received signals; equalizing units for correcting amplitudes and phases of the respective received signals; and a combining unit for combining demodulation results from the respective received signals on the basis of noise amplitude detection results.

3 Claims, 8 Drawing Sheets

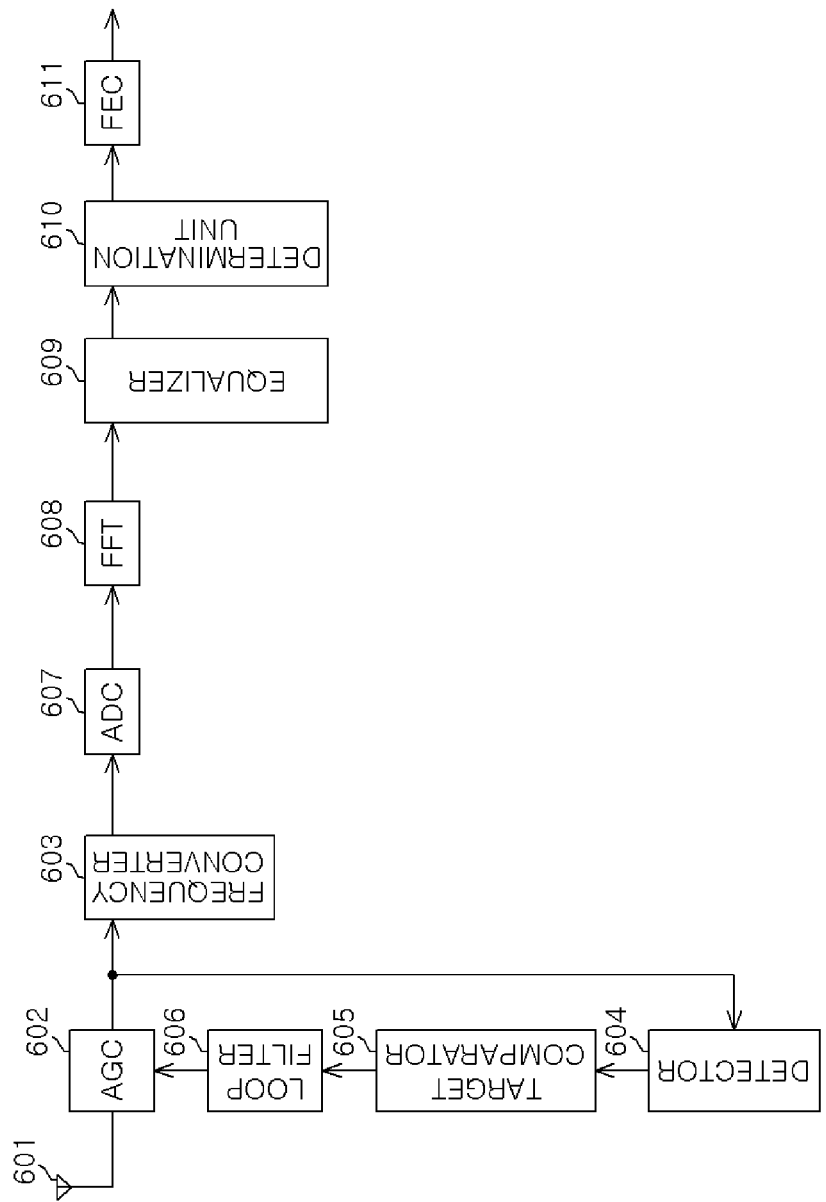

A: CURRENT DETECTION SIGNAL
B: PREVIOUS DETECTION SIGNAL BEFORE $T_1$
C: PREVIOUS DETECTION SIGNAL BEFORE $2T_1$

RECEIVER

CROSS-REFERENCE TO RELATED APPLICATIONS

This application is a Continuation Application of PCT International Application No. PCT/JP2014/081730 filed on Dec. 1 2014, which designated the United States. This application claims priority to Japanese Patent Application No. 2013-254967 filed on Dec. 10, 2013, the entire contents of which are incorporated herein by reference.

FIELD OF THE INVENTION

The present invention relates to a receiver, and more particularly to a receiver having a resistance to burst interference.

BACKGROUND OF THE INVENTION

A configuration of a conventional receiver will be described with reference to FIG. 6.

An orthogonal frequency-division multiplexing (OFDM) modulation signal received by an antenna 601 is inputted to an automatic gain control (AGC) unit 602 and gain-adjusted based on a gain control signal from a loop filter 606 such that an output signal level becomes a predetermined value. The level-adjusted received signal which is an output of the AGC unit 602 is outputted to a frequency converter 603 and a detector 604.

The detector 604 detects the level of the input signal and outputs the signal to a target comparator 605. This signal is hereinafter referred to as a detection signal.

The target comparator 605 compares the input value with a preset target value, generates a gain control signal based on the comparison result to make the detection signal close to the target value, and outputs the gain control signal to the loop filter 606. The loop filter 606 extracts a low frequency component of the input signal and outputs the low frequency component to the AGC unit 602. The loop filter is used for the purpose of suppressing oscillation.

The frequency converter 603 converts the frequency of the input signal into an intermediate frequency (IF) band, performs channel selection filtering to pass the frequency band of one channel, and outputs the filtered signal to an analog-to-digital converter (ADC) unit 607. The ADC unit 607 converts the signal inputted from the frequency converter 603 into a digital signal and outputs the digital signal to a fast Fourier transform (FFT) unit 608. In this case, a sampling rate is determined by OFDM parameters (the number of FFT points and an effective symbol length).

The FFT unit 608 converts the input signal into a signal of a frequency domain and outputs the converted signal to an equalizer 609. The equalizer 609 performs equalization processing for correcting the amplitude and phase of the input signal, and outputs the equalization result to a determination unit 610. The determination unit 610 determines the input signal, associates the determination result with an error correction likelihood, and outputs the resultant signal to a forward error correction (FEC) unit 611. The FEC unit 611 performs de-interleaving processing on the input signal, and performs error correction of the signal based on the error correction likelihood for the determination result.

As another related art, for example, in Patent Document 1, each system for received signal processing includes an amplifier, an AGC circuit for automatic gain control having a different response speed, and an ADC. A digital signal processor which receives the signals having passed through the systems selects digital data having the lowest error rate from among the systems. Thus, it is possible to obtain the received signal data having the lowest error rate. For example, it discloses a technique for selecting an output of the system having the AGC circuit with a fast response speed when the received signal undergoes interference of fast level variations such as fading, and selecting an output of the system having the AGC circuit with a slow response speed when the received signal uses a modulation scheme with an amplitude component.

Patent Document 1: Japanese Patent Application Publication No. 2004-201066
Patent Document 2: Japanese Patent Application Publication No. 2010-130630
Patent Document 3: Japanese Patent Application Publication No. 2010-45706
Patent Document 4: Japanese Patent Application Publication No. 2006-319608

The problems in the above-mentioned related art will be described with reference to FIGS. 7A to 7E. FIGS. 7A to 7E are diagrams for explaining the adverse effects of interferences in the receiver.

In FIG. 7A shows the power spectrum when large-level interference due to, e.g., a radar appears in the same band as the desired wave. Further, FIG. 7B represents the reception level when the interference is mixed repeatedly and intermittently. In the conventional receiver of FIG. 6, it is difficult for the gain control signal to follow the level variation at a high speed.

In FIG. 7C shows a graph of an ideal gain control signal and a conventional gain control signal. The ideal gain control signal controls the gain so as not to cause intermodulation distortion of an analog element by lowering the gain control signal immediately even when interference is mixed, and returns the gain control signal to an original state immediately even when interference is no longer mixed to prevent desensitization in the analog element.

However in a feasible receiver, if a time constant of the loop filter is shortened by allowing the gain control signal to follow at a high speed, oscillation may occur. Accordingly, the time constant cannot be shortened. Thus, as shown by a dotted line in FIG. 7C, both when the interference is mixed and when the interference is no longer mixed, the gain control signal deviates from the ideal value. Thus, since the gain control cannot follow at a high speed, the level of the received signal when the interference is mixed reaches a nonlinear region of the analog element to cause intermodulation distortion in the frequency converter 603, thereby resulting in deterioration of the transmission quality.

SUMMARY OF THE INVENTION

In view of the above, the present invention provides a receiver configured to perform error correction using a received signal which is adjusted to an optimum gain both when interference is mixed and when interference is not mixed.

In accordance with an aspect of the present invention, there is provided a receiver including: one or more antenna units configured to receive modulated signals; a first and a second amplification unit configured to respectively amplify a first and a second received signal, which are received by the one or more antenna units, with a variable gain; a level variation detection unit configured to perform gain control of the first amplification unit; a maximum received signal level extraction unit configured to perform gain control of the second amplification unit; a first and a second frequency conversion unit configured to frequency-convert the amplified first received signal and the amplified second received signal, respectively; an interference frequency detection unit configured to detect a frequency of interference included in the second received signal; an interference frequency cut-off unit configured to cut off the frequency of the interference from the second received signal; a first and a second demodulation unit configured to demodulate the first and the second received signal, respectively; a first and a second noise amplitude calculation unit configured to calculate noise amplitudes from the first and the second received signal, respectively; a first and a second equalizing unit configured to correct amplitudes and phases of the first and the second received signal, respectively, in a frequency domain; a combining unit configured to combine demodulation results of the first and the second received signal based on the noise amplitudes calculated by the first and the second noise amplitude calculation unit; an error correction likelihood modifying unit configured to reduce an error correction likelihood of a frequency signal into which the interference is mixed based on a frequency detection result of the interference, with regard to a combination result of the combining unit; and an error correction unit configured to perform error correction decoding using the likelihood modified by the error correction likelihood modifying unit.

Further, in the above-described receiver, the level variation detection unit includes a holding unit to hold levels of the first received signal, and detects a level variation of a received signal by comparing a level of a newly received signal with an average value of the levels of the first received signal held by the holding unit. The first amplification unit uses the level of the newly received signal for the gain control if the level variation detected by the level variation detection unit is equal to or less than a predetermined value, and uses a level of a received signal immediately before the level variation exceeds the predetermined value for the gain control if there is a sudden level variation exceeding the predetermined value.

Further, in the above-described receiver, the maximum received signal level extraction unit may include a holding unit to hold levels of the second received signal, and extracts a maximum level of a received signal from levels of a previously received signal held by the holding unit and a level of a newly received signal. The second amplification unit may use a result of the maximum received signal level extraction unit for the gain control.

Further, the above-described receiver may further include a first and a second fast Fourier transform (FFT) unit, which are respectively provided before the first and the second equalizing unit, for respectively converting the first and the second received signal into frequency domain signals. The interference frequency cut-off unit may cut off the frequency of the interference at a stage prior to the second FFT unit.

According to the present invention, it is possible to perform error correction using a received signal which is adjusted to an optimum gain both when interference is mixed and when interference is not mixed.

BRIEF DESCRIPTION OF THE DRAWINGS

FIG. 6 is a block diagram of a receiver according to the related art.

DETAILED DESCRIPTION OF THE EMBODIMENTS

Hereinafter, various embodiments of the present invention will be described in detail with reference to accompanying drawings.

First Embodiment

Figure 1:
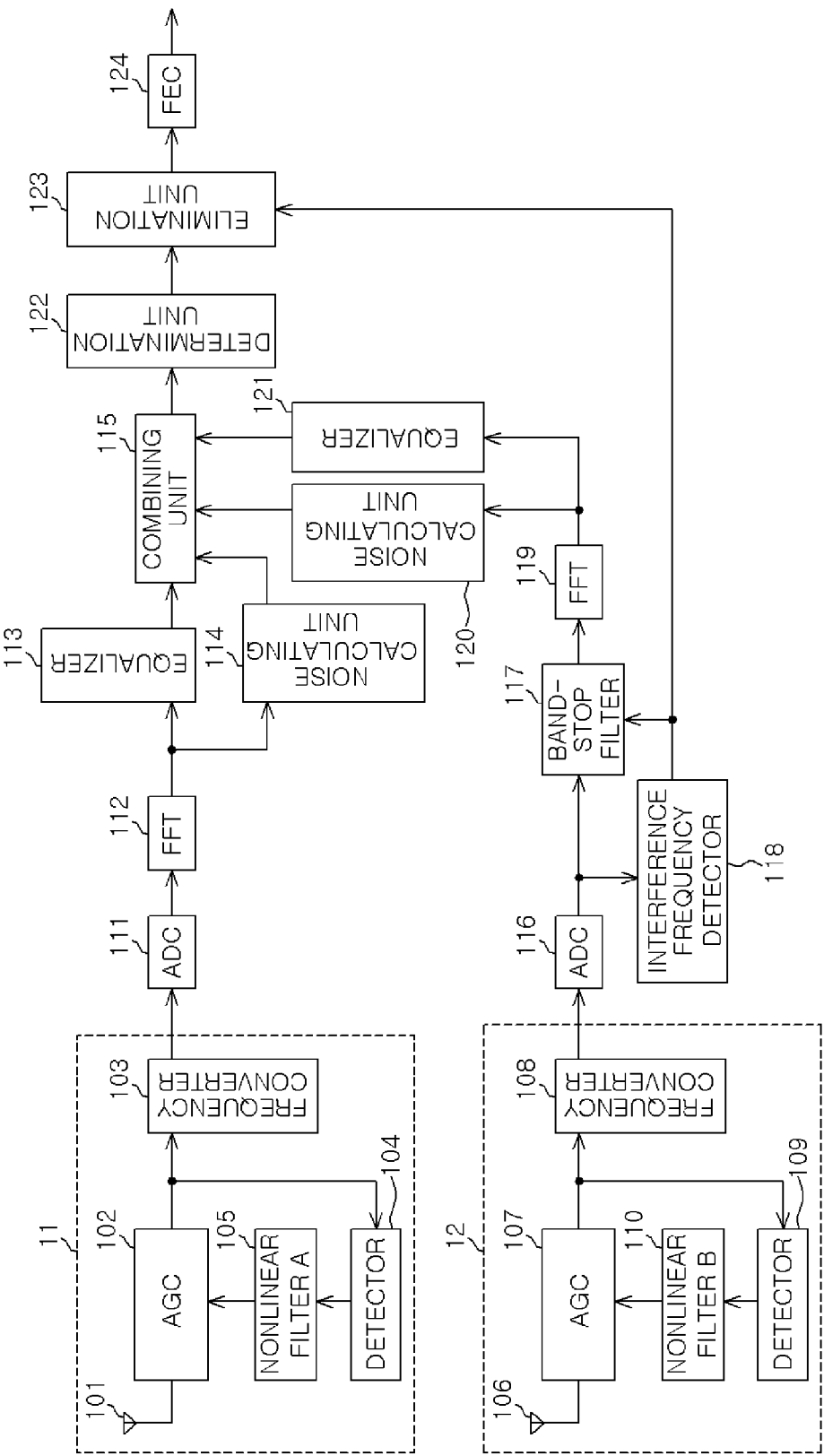
FIG. 1 is a block diagram of a receiver according to a first embodiment of the present invention.

FIG. 1 is a block diagram for explaining a receiver according to a first embodiment of the present invention. The receiver includes a reception system A 11, a reception system B 12, analog-to-digital converters (ADCs) 111 and 116, fast Fourier transform (FFT) units (demodulation units) 112 and 119, equalizers 113 and 121, noise calculating units 114 and 120, a combining unit 115, a band-stop filter (interference frequency cut-off unit) 117, an interference frequency detector 118, a determination unit 122, a elimination unit 123, and a forward error correction (FEC) unit 124.

First, the reception system A 11 will be described in detail.
A signal received by a reception antenna 101 of the reception system A 11 is inputted to an automatic gain control (AGC) unit (amplification unit) 102. The AGC unit 102 adjusts the gain of the input signal such that a level of the received signal becomes a predetermined level based on a gain control signal inputted from a nonlinear filter A 105. Then, the gain-adjusted received signal is inputted to a frequency converter 103 and a detector 104. The detector 104 detects the level of the input signal, and outputs the detection result to the nonlinear filter A 105. The frequency converter 103 performs down-converting into an intermediate frequency (IF) band and channel selection filtering. Here, the detector 104 and the nonlinear filter A 105 constitute a level variation detection unit.

Next, the reception system B 12 will be described in detail.
Similarly to the reception antenna 101 of the reception system A 11, a signal received by a reception antenna 106 of the reception system B 12 is inputted to an automatic gain control (AGC) unit (amplification unit) 107. The AGC unit 107 adjusts the gain of the input signal such that a level of the received signal becomes a predetermined level based on a gain control signal inputted from a nonlinear filter B 110, and outputs the gain-adjusted received signal to a frequency converter 108 and a detector 109. The detector 109 detects the level of the input signal and outputs a signal to the nonlinear filter B 110. Here, the detector 109 and the nonlinear filter B 110 constitute a maximum received signal level extraction unit.

In the reception system B 12, the gain control is performed to allow the gain to follow only the level of the interference which is intermittently mixed. Thus, by using a detection signal when the interference is mixed, in the gain control signal outputted from the nonlinear filter B 110, intermodulation distortion caused by an analog element does not occur even when the interference is mixed.

If the reception antenna 106 knows the direction of an interference source, a null point of sensitivity directivity may be directed toward the interference source. In this case, although the gain is not a maximum with respect to a signal source of a desired wave, a ratio of the level of the interference to the level of the desired wave is compressed, thereby improving a carrier-to-noise ratio (hereinafter, simply referred to as "C/N").

The configurations of the frequency converters 103 and 108 are the same, and the same local signal may be applied in common to the frequency converters 103 and 108. Each of the detector 104 and the detector 109 is a root mean square (RMS) or logarithmic power detector. The detector is configured to have a response time that is greater than the reciprocal of the bandwidth of the OFDM symbol, shorter than the interference mixing interval (or mixing period), and not too long compared to the length of the OFDM symbol. In other words, the detector is not sensitive to the peak of the OFDM signal itself, but can immediately detect the interference and can track a variation of the desired wave. For example, if the interference mixing interval is 5 ms and the desired wave fading period is 25 ms, the response time (and the sampling period of an ADC 301 which will be described later) is preferably about 0.5 ms.

Next, the processing after the frequency converter 103 (108) of each reception system will be described.

In the reception system A 11, the frequency-converted signal is inputted to the ADC 111 and converted into a digital signal. The converted digital signal is outputted to the FFT unit 112. The signal of each reception system needs to be a complex signal including in-phase and quadrature components when inputted to the FFT unit 119, and analog or digital quadrature detection is performed before or after the ADC 111.

The FFT unit 112 converts the input signal into a signal of a frequency domain, and outputs the converted signal to the equalizer 113 and the noise calculating unit 114. The equalizer 113 corrects the amplitude and phase of the input signal and outputs the corrected signal to the combining unit 115.

The noise calculating unit 114 calculates a noise amplitude included in the input signal and outputs the noise amplitude to the combining unit 115. As a noise calculation method, there is, for example, a method of estimating the noise amplitude by using a pilot signal that is a known signal. That is, since the transmission path does not vary greatly temporally in several symbols, the noise amplitude included in the received signal is calculated by subtracting the pilot signal of two consecutive symbols. Besides, there is a method of using the average of the distance between the reception point and an ideal reception point. The noise amplitude is preferably calculated and outputted at the same frequency as the OFDM symbol.

In the reception system B 12, the frequency-converted signal is inputted to the ADC 116. The ADC 116 converts the input signal into a digital signal, and outputs the converted digital signal to the band-stop filter 117 and the interference frequency detector 118. The band-stop filter 117 uses a filter configured to cut off the frequency of the interference with respect to the signal inputted from the ADC 116 based on a signal indicating the position of the interference frequency inputted from the interference frequency detector 118 which will be described later. By outputting the signal to the FFT unit 119 after removing the frequency at which excessive interference is mixed, it is possible to reduce the deterioration of the C/N due to FFT.

The interference frequency detector 118 performs frequency spectrum analysis on the input signal, and recognizes the frequency at which the signal level exceeds a threshold value set based on an average value of the signal level as the frequency at which the interference is mixed. Then, the interference frequency detector 118 outputs a signal indicating the interference frequency and the amplitude of the interference to the band-stop filter 117 and the elimination unit 123. The frequency spectrum analysis differs from the processing of the FFT unit 112 and the like in that an appropriate window function is performed before the FFT processing or a larger number of points are used to expand the scanning range. That is, the output of the interference frequency detector 118 preferably has the same timing as the timing at which the determination result of the OFDM symbol temporally corresponding to the output of the interference frequency detector 118 is processed by the elimination unit 123, and the operation and output period of the interference frequency detector 118 does not have to match the OFDM symbol period.

The FFT unit 119 converts the input signal into a signal of a frequency domain and outputs the converted signal to the noise calculating unit 120 and the equalizer 121. The noise calculating unit 120, similarly to the noise calculating unit 114, calculates the noise amplitude from the input signal, and outputs the noise amplitude to the combining unit 115.

The equalizer 121, similarly to the equalizer 113, corrects the amplitude and phase of the input signal and outputs the corrected signal to the combining unit 115.

The combining unit 115 combines the signals of the two reception systems based on the noise amplitude calculated by the noise calculating unit 114 (noise calculating unit 120) of each reception system, and outputs the combined signal to the determination unit 122.

As a combining method, there are a method of selecting a signal of the reception system with a small noise amplitude, and a method of applying a weight to the signal of each reception system such that it becomes greater as the noise amplitude is smaller and adding the weighted signals. The combining is basically carried out on an OFDM symbol basis.

The determination unit 122 determines the input signal, associates the determination result with an error correction likelihood, and outputs the resultant signal to the elimination unit 123. The likelihood is calculated from a magnitude (error vector magnitude (EVM)) of a difference between the determination result and the input signal. Here, the determination unit 122 and the elimination unit 123 constitute an error correction likelihood modifying unit.

The elimination unit 123 changes the error correction likelihood of the interference frequency according to the amplitude of the interference based on the signal inputted from the interference frequency detector 118, and outputs the changed error correction likelihood to the FEC unit 124. For example, if the amplitude of the interference is large, the error correction likelihood of the signal influenced by the interference is lowered by setting the error correction likelihood to have a small value or "0" (negative infinity if it is a log-likelihood).

The FEC unit 124 performs de-interleaving processing on the input signal to perform error correction based on the error correction likelihood for the determination result.

By using the circuit described above, it is possible to improve the transmission performance by performing error correction using the signal whose level is adjusted optimally both when the interference is mixed and when the interference is not mixed.

Figure 2:
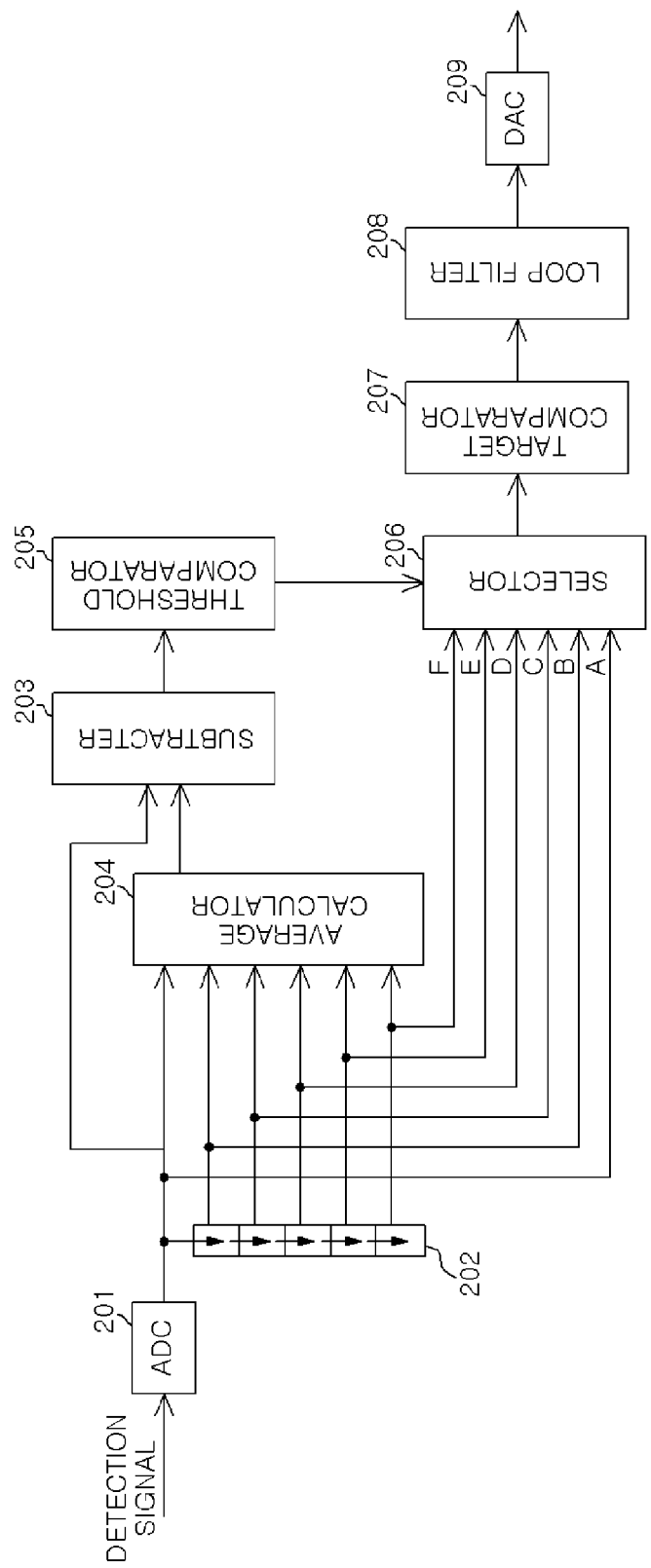
FIG. 2 is a block diagram of a nonlinear filter A of the receiver of the first embodiment.

FIG. 2 is a block diagram of the nonlinear filter A 105 of the receiver of the first embodiment.

In the nonlinear filter A 105, an ADC 201 converts the input signal into a digital signal, and outputs the converted digital signal to a multi-stage shift register (holding unit) 202, a subtracter 203, an average calculator 204, and a selector 206. In the shift register 202, the input signal is sequentially moved to the next register at an interval of time $T_1$, and the value of each register is outputted to the average calculator 204.

The average calculator 204 calculates the average value and outputs the calculation result to the subtractor 203. The subtractor 203 performs subtraction between the current detection signal inputted from the ADC 201 and the average value of the previous detection signals (held by the shift register 202) inputted from the average calculator 204, and outputs the subtraction result to a threshold comparator 205. The subtraction result represents how rapidly the current detection signal has changed compared to the previous signal.

The threshold comparator 205 compares the input subtraction result with a preset threshold value. If the subtraction result exceeds the preset threshold value, the threshold comparator 205 determines that the interference is mixed because a sudden level variation occurs, and sets a flag to be outputted to the selector 206 to "Hi." If the subtraction result does not exceed the preset threshold value, the threshold comparator 205 determines that the interference is not mixed, and sets the flag to "Lo." According to the flag inputted from the threshold comparator, the selector 206 selects and outputs one signal from among the current detection signal inputted from the ADC 201 and the previous detection signals inputted from the shift register 202.

Next, the selection criteria of the selector 206 will be described with reference to FIG. 7E.

FIGS. 7A to 7E are timing charts for explaining the gain control of the receiver of the first embodiment and the related art.

When the flag is "Lo," the selector 206 outputs the current detection signal. When the flag is "Hi," the selector 206 selects the detection signal before the flag becomes "Hi" and outputs the selected detection signal to a target comparator 207. Symbols A, B and C shown in FIG. 7E indicate the types of the input signal from the shift register 202 of the selector 206 of FIG. 2.

Accordingly, it is possible to provide a protection function such that the gain does not follow the interference level when the detection signal varies greatly because the interference is mixed. Further, it is possible to vary the number of the previous detection signals that can be stored by the number of resisters included in the shift register 202, and change a period of time that can be protected. The protection period determined by the number of resisters and the time $T_1$ (sampling rate of the ADC 201) is preferably set to be longer than the mixing period of the interference.

The target comparator 207 compares the input value with a preset target value, generates a gain control signal such that the detection signal becomes close to the target value based on the comparison result, and outputs the gain control signal to a loop filter 208. The loop filter 208 extracts a low frequency component of the input signal and outputs the low frequency component to a digital-to-analog converter (DAC) 209.

Since the loop filter 208 is provided for the purpose of suppressing oscillation, the loop filter 208 has a time constant similar to that of a loop filter 606. The DAC 209 converts the input digital signal into an analog signal, and outputs the converted analog signal to the AGC unit 102.

Thus, the nonlinear filter A 105 uses, as a feedback signal, the latest detection signal if there is no interference, or the detection signal immediately before interference occurs if there is interference.

Figure 3:
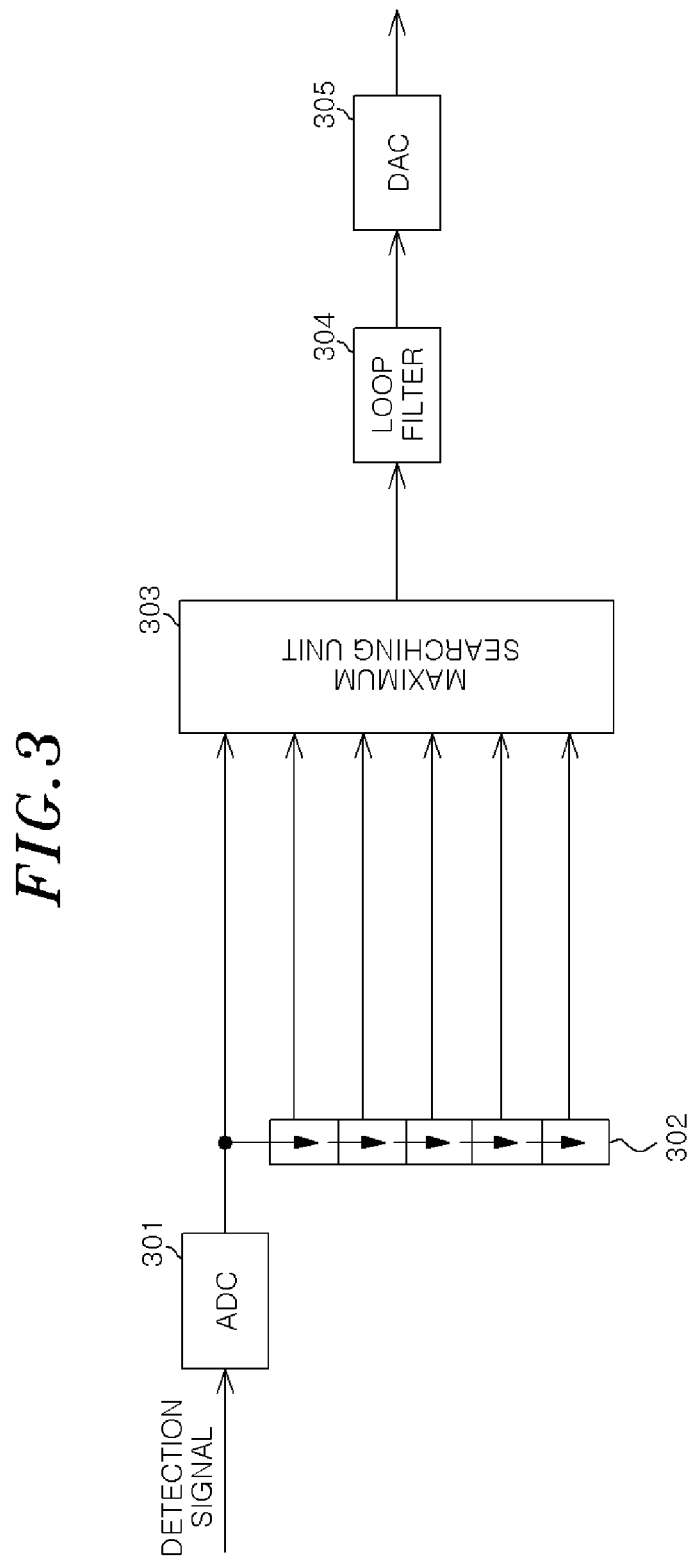
FIG. 3 is a block diagram of a nonlinear filter B of the receiver of the first embodiment.

FIG. 3 is a block diagram of the nonlinear filter B of the receiver of the first embodiment.

In the nonlinear filter B 110, the input value is inputted to the ADC 301. The ADC 301 converts the input signal into a digital signal, and outputs the converted digital signal to a shift register (holding unit) 302 and a maximum searching unit 303. In the shift register 302, the input signal is sequentially moved to the next register at an interval of time $T_2$, and the value stored in each register is outputted to the maximum searching unit 303.

The maximum searching unit 303 searches for the maximum value of the input value, and outputs the maximum value to a loop filter 304. Thus, the nonlinear filter B can have a function of holding the maximum value of the input value as many as the number of registers provided in the shift register 302.

As described above, the nonlinear filter B 110 always uses the detection signal when the interference is mixed. In other words, the detection signal when the interference is mixed needs to be present in the register of the shift register 302, the time $T_2$ is required to be shorter than the interference mixing period, and the number of registers of the shift register 302 is required to set such that the holding period corresponding thereto becomes longer than the interference mixing interval. Further, in order to facilitate following the level variation of the interference, if possible, the holding period is preferably less than twice the interference mixing interval. Since a radar, which is a typical interference source, generally operates periodically and its period is well known, it is easy to set the number of registers as described above. For example, if the interference mixing period is 50 µs, the time $T_2$ (sampling rate of the ADC 301) may be set to be about 25 µs.

The AGC unit 107 of the reception system B can always control the gain to an optimum gain for the level of the interference so as not to cause nonlinear distortion of the analog element. The loop filter 304 extracts a low frequency component of the input signal and outputs the low frequency component to a DAC 305. Since the loop filter 304 is also provided for the purpose of suppressing oscillation, the loop filter 304 has a time constant similar to those of the loop filters 208 and 606. The DAC 305 converts the input digital signal into an analog signal, and outputs the converted analog signal to the AGC unit 107.

Second Embodiment

Figure 4:
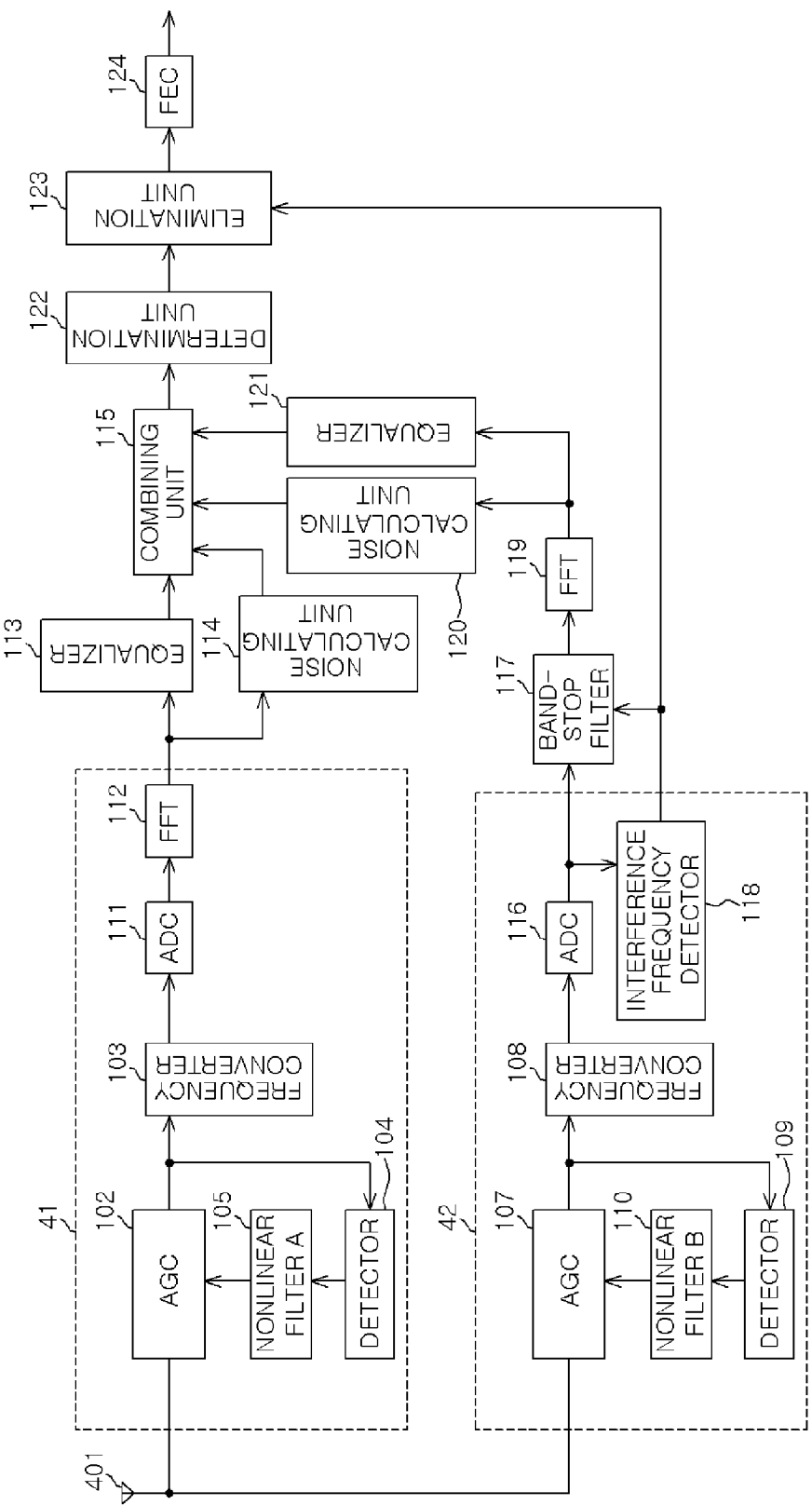
FIG. 4 is a block diagram of a receiver according to a second embodiment.

FIG. 4 is a block diagram of a receiver according to a second embodiment of the present invention.

The signal received by an antenna 401 is inputted to the AGC unit 102 and the AGC unit 107. Since the subsequent processing is the same as in the first embodiment, a description thereof will be omitted.

The signal received by one antenna is inputted to two independent gain control units. Similarly to the first embodiment, error correction is carried out by using the gain-adjusted signal different for each system. Thus, it is possible to obtain the same effect as the first embodiment and also reduce the number of antennas.

Third Embodiment

Figure 5:
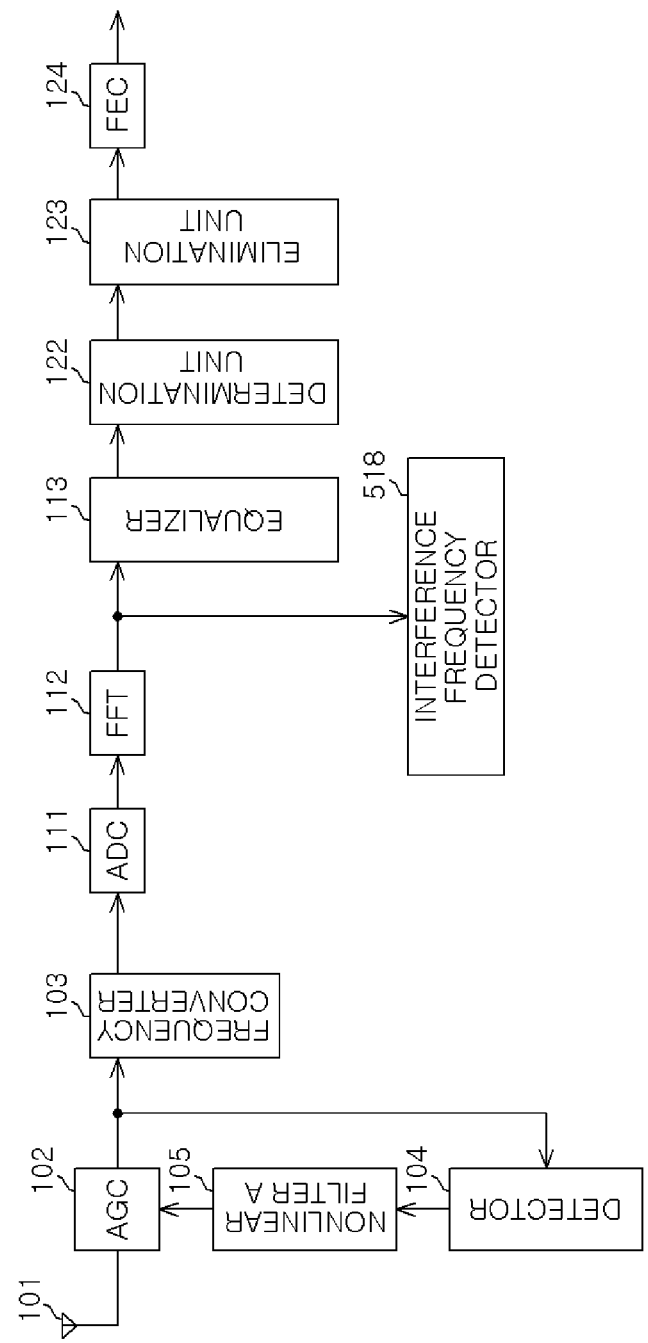
FIG. 5 is a block diagram of a receiver according to a third embodiment.

FIG. 5 is a block diagram for explaining a configuration of a receiver according to a third embodiment of the present invention.

The signal received by the antenna 101 is inputted to the AGC unit 102. Since the configurations and operations of the AGC unit 102 to the FFC unit 124 are substantially the same as in the first embodiment except for the following points, a description thereof will be omitted.

The receiver of the present embodiment includes an interference frequency detector 518 instead of the interference frequency detector 118. The interference frequency detector 518 detects the presence or absence of a subcarrier subjected to interference and the frequency of the subcarrier at an interval of an OFDM symbol period from the signal converted into a signal of a frequency domain by the FFT unit 112 and outputs the detection result to the elimination unit 123. The interference frequency detector 518 checks whether, for each subcarrier, the power of the subcarrier exceeds a threshold value set based on the average power of all subcarriers in the OFDM symbol, or a ratio or difference between the power of the subcarrier and the power (average power) of the subcarrier(s) one or more past OFDM symbols exceeds a threshold value, and determines that the subcarrier is subjected to interference if one of the above-described values exceeds the threshold value. When subjected to interference of a strong radar, all subcarriers may disappear completely; however, even in the case that it is not possible to perform the above detection, the present embodiment is effective.

The elimination unit 123 sets the error correction likelihood of the signal of the frequency and time at which the interference is mixed based on the signal outputted from the interference frequency detector 118 to a fixed small value or "0" and outputs the signal to the FEC unit 124.

The FEC unit 124 performs deinterleaving processing on the input signal to perform error correction based on the error correction likelihood for the determination result. The deinterleaving processing is a process performed over a plurality of OFDM symbols (i.e., an interleave length is greater than the number of demodulation bits of one OFDM symbol). The oscillation period of many radars is longer than the OFDM symbol, generally, over several symbols. By performing interleaving over a plurality of OFDM symbols longer than the interference mixing period, it is possible to recover errors.

By the above-described processing, even in the case of one reception system, even when the received signal level varies greatly because the interference is mixed, the gain of the AGC unit 102 does not follow the interference level. Accordingly, the gain control for a period during which the interference is not mixed can be maintained at an optimum value.

Also, for a period during which the interference is mixed, by reducing the error correction likelihood, it is possible to achieve efficient error correction processing by not using a signal deteriorated due to the influence of the interference, thereby reducing a code error rate.

Fourth Embodiment

Figure 8:
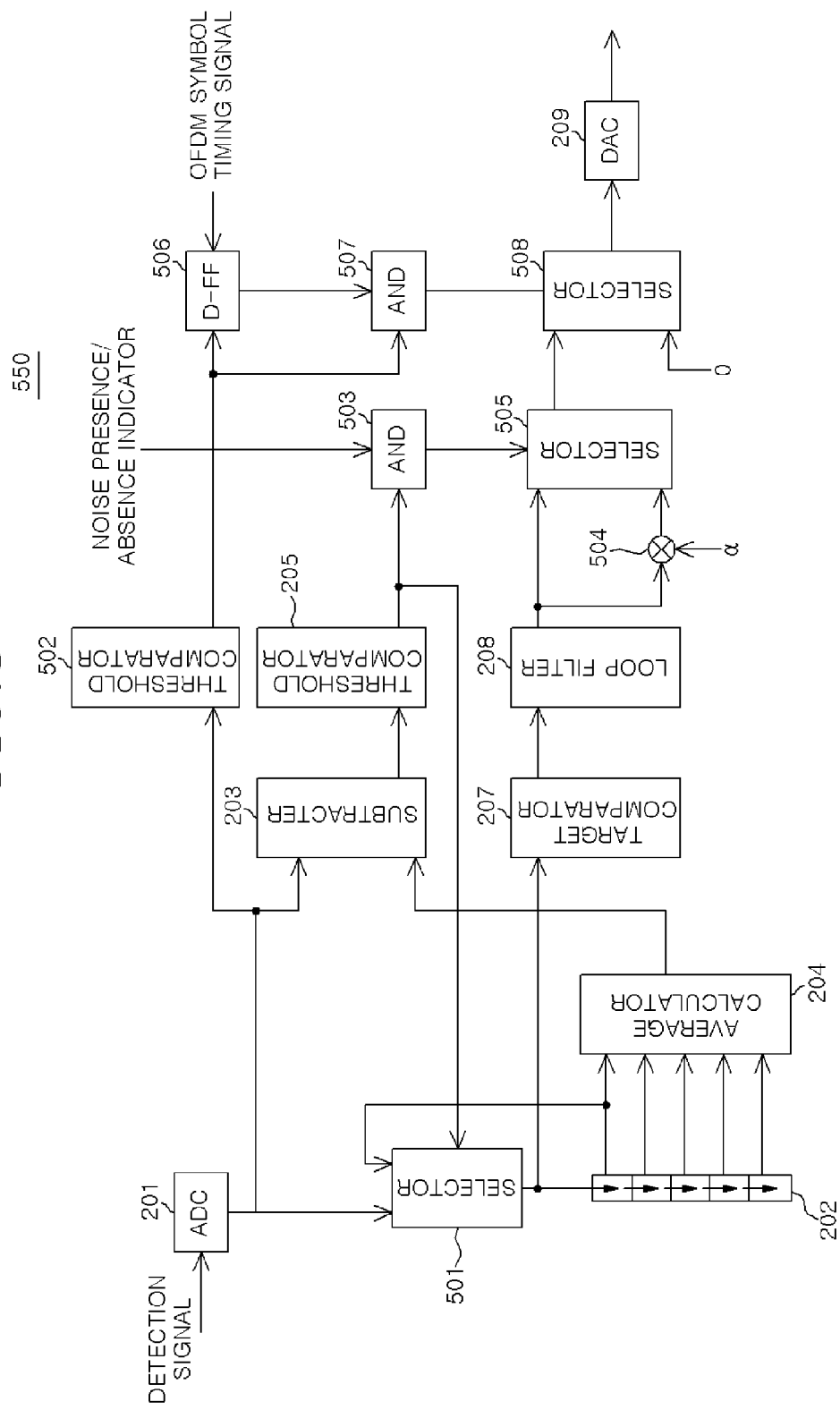
FIG. 8 is a block diagram of a nonlinear filter 550 of a receiver according to a fourth embodiment.

FIG. 8 is a block diagram of a nonlinear filter 550 according to a fourth embodiment. The nonlinear filter 550 of the present embodiment is used in place of the nonlinear filter A 105 of the first to third embodiments. A description of the same configuration as the nonlinear filter A 105 will be omitted.

If it is determined that interference occurs in the threshold comparator 205, a selector 501 selects an output of a first stage of the shift register 202, i.e., the detection signal outputted from itself at the previous sampling timing, while outputting "Hi," and selects and outputs the current detection signal from the ADC 201 while outputting "Lo." Thus, with only the first stage of the shift register, it is possible to continuously hold the detection signal when the interference is not mixed.

A threshold comparator 502 determines whether the current detection signal from the ADC 201 exceeds a level that does not satisfy the required C/N by saturating the frequency converter 103 or the ADC 111 even though the gain of the AGC unit has been minimized, and outputs a logical value ("Hi" and "Lo") corresponding thereto.

An AND device 503 receives the logical value from the threshold comparator 205 and a logical value indicating the presence or absence of noise, and outputs a logic product (AND) thereof. A noise presence/absence indicator may be obtained by the noise calculating unit 114 through threshold processing of the noise amplitude calculated at each OFDM symbol timing, or the C/N value derived therefrom. Since there is a delay of one or more OFDM symbols in the calculated noise amplitude, the threshold value is also preferably delayed and switched depending on a selection state of a selector which will be described later. As the noise presence/absence indicator, "Hi" (true) is preferably held when there is noise that exceeds a threshold value in the interference mixing period.

A coefficient multiplier 504 multiplies the output of the loop filter 208 by a predetermined coefficient α, and outputs the multiplication result to a selector 505. The coefficient is to be applied when the threshold comparator 205 determines that there is interference and a logical value indicating the presence of noise is inputted. The coefficient is generally a positive number less than 1.

The selector 505 selects an input from the coefficient multiplier 504 if the output of the AND device 503 is "Hi" or an input from the loop filter 208 if the output of the AND device 503 is "Lo," and outputs the input to a selector 508.

A D-FF (Flip Flop) 506, whenever the OFDM symbol timing signal is inputted as a clock, holds the signal from the threshold comparator 502 and outputs the signal to an AND device 507.

The AND device 507 receives a signal from the threshold comparator 502 and a signal delayed by the D-FF 506, and outputs a logic product thereof to the selector 508.

The selector 508 selects 0 (or minimum value) if the signal from the AND device 507 is "Hi" or the signal from the selector 505 if the signal from the AND device 507 is "Lo," and outputs it to the DAC 209.

With this configuration, the gain of the AGC unit is switched to a minimum value when reaching the initial OFDM symbol boundary while the output of the threshold comparator 502 is "Hi," and returns to the signal from the loop filter 208 immediately when the output of the threshold comparator 502 is changed to "Lo."

Figure 7A:
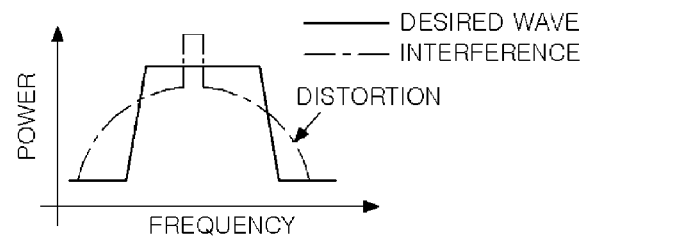
FIGS. 7A to 7E are timing charts for explaining the gain control of the receiver of the present invention and the related art.
Figure 7B:
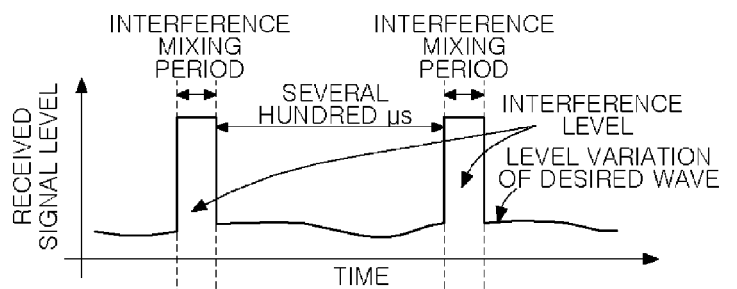
Figure 7C:
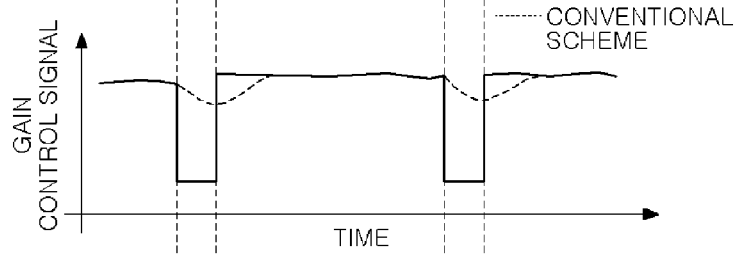
Figure 7D:
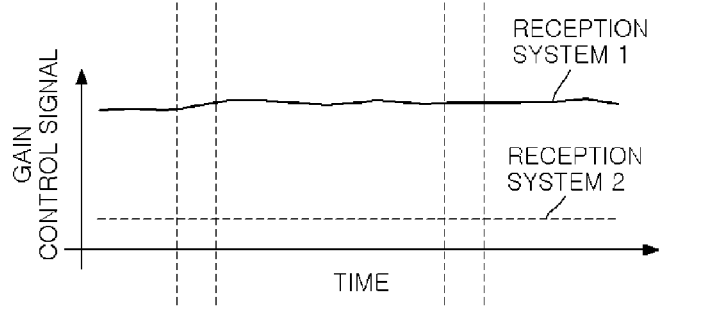
Figure 7E:

According to the embodiments described above, the receiver of the present invention undergoes the level variation of the received signal as shown in FIG. 7B when the interference is mixed. The desired wave varies with a change in a propagation path, but the variation is a gradual variation compared to the interference mixing interval. Thus, by using a plurality of reception systems, each having an independent gain adjustment function, as shown in FIG. 7D, the gain of the reception system A is allowed to follow only the variation of the desired wave, and the gain of the reception system B is allowed to follow only the level of the interference. In other words, the reception system A 11 maintains the optimum gain even when the interference is mixed by not allowing the gain to follow the level of the interference as well as when the interference is not mixed. On the other hand, the reception system B 12 performs control so as not to cause nonlinear distortion of the analog element even in a period during which the interference is mixed by performing control to follow the level of the interference. Then, by performing a demodulation process on the gain-adjusted signal of each reception system, the reception system is switched between a period during which the interference is mixed and a period during which the interference is not mixed. Further, by applying a weight to the signal of each system and combining the weighted signals, it is possible to perform error correction using the signal adjusted to the optimum gain instantaneously.

Further, according to the embodiments described above, the receiver of the present invention can perform error correction using the received signal adjusted to the optimum gain both when the interference is mixed and when the interference is not mixed.

INDUSTRIAL APPLICABILITY

The present invention can be widely applied to a radio receiver, and more particularly to a radio system using an OFDM scheme, a single-carrier modulation with frequency domain equalization (SC-FDE) scheme for performing frequency domain equalization with respect to a desired wave, or a DFT-Spread OFDM scheme, or a radio system using white space frequencies.

What is claimed is:
1. A receiver comprising:
one or more antenna units configured to receive modulated signals;
a first and a second amplification unit configured to respectively amplify a first and a second received signal, which are received by the one or more antenna units, with a variable gain;
a level variation detection unit configured to perform gain control of the first amplification unit;
a maximum received signal level extraction unit configured to perform gain control of the second amplification unit;
a first and a second frequency conversion unit configured to frequency-convert the amplified first received signal and the amplified second received signal, respectively;
an interference frequency detection unit configured to detect a frequency of interference included in the second received signal;
an interference frequency cut-off unit configured to cut off the frequency of the interference from the second received signal;
a first and a second demodulation unit configured to demodulate the first and the second received signal, respectively;
a first and a second noise amplitude calculation unit configured to calculate noise amplitudes from the first and the second received signal, respectively;
a first and a second equalizing unit configured to correct amplitudes and phases of the first and the second received signal, respectively, in a frequency domain;
a combining unit configured to combine demodulation results of the first and the second received signal based on the noise amplitudes calculated by the first and the second noise amplitude calculation unit;
an error correction likelihood modifying unit configured to reduce an error correction likelihood of a frequency signal into which the interference is mixed based on a frequency detection result of the interference, with regard to a combination result of the combining unit; and
an error correction unit configured to perform error correction decoding using the likelihood modified by the error correction likelihood modifying unit,
wherein the level variation detection unit includes a holding unit to hold levels of the first received signal, and detects a level variation of a received signal by comparing a level of a newly received signal with an average value of the levels of the first received signal held by the holding unit, and
wherein the first amplification unit uses the level of the newly received signal for the gain control if the level variation detected by the level variation detection unit is equal to or less than a predetermined value, and uses a level of a received signal immediately before the level variation exceeds the predetermined value for the gain control if there is a sudden level variation exceeding the predetermined value.

2. The receiver of claim 1, wherein the maximum received signal level extraction unit includes a holding unit to hold levels of the second received signal, and extracts a maximum level of a received signal from levels of a previously received signal held by the holding unit and a level of a newly received signal, and
wherein the second amplification unit uses a result of the maximum received signal level extraction unit for the gain control.

3. The receiver of claim 1, further comprising a first and a second fast Fourier transform (FFT) unit, which are respectively provided before the first and the second equalizing unit, for respectively converting the first and the second received signal into frequency domain signals, and
wherein the interference frequency cut-off unit cuts off the frequency of the interference at a stage prior to the second FFT unit.

* * * * *